(12) United States Patent
Kan et al.

(10) Patent No.: US 7,801,860 B2
(45) Date of Patent: Sep. 21, 2010

(54) SYSTEM AND METHOD FOR HIGHLY AVAILABLE DATA PROCESSING IN CLUSTER SYSTEM

(75) Inventors: Masataka Kan, Yokohama (JP); Norihiro Hara, Kawasaki (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 701 days.

(21) Appl. No.: 10/994,457

(22) Filed: Nov. 23, 2004

(65) Prior Publication Data
US 2005/0144197 A1 Jun. 30, 2005

(30) Foreign Application Priority Data
Dec. 24, 2003 (JP) ............................. 2003-426378
Aug. 26, 2004 (JP) ............................. 2004-246091

(51) Int. Cl.
*G06F 7/00* (2006.01)
*G06F 17/00* (2006.01)
(52) U.S. Cl. ........................ 707/648; 707/640; 707/649
(58) Field of Classification Search ................. 707/640, 707/648, 649
See application file for complete search history.

(56) References Cited

U.S. PATENT DOCUMENTS

| | | | |
|---|---|---|---|
| 6,950,848 B1 * | 9/2005 | Yousefi'zadeh | 709/203 |
| 7,020,697 B1 * | 3/2006 | Goodman et al. | 709/223 |
| 7,065,540 B2 * | 6/2006 | Chandrasekaran et al. | 707/203 |
| 2003/0040889 A1 * | 2/2003 | Coffey et al. | 702/188 |
| 2003/0105852 A1 * | 6/2003 | Das et al. | 709/223 |
| 2004/0078397 A1 * | 4/2004 | Mehta et al. | 707/202 |
| 2004/0193658 A1 * | 9/2004 | Kawamura et al. | 707/202 |
| 2006/0074847 A1 * | 4/2006 | Yatabe et al. | 707/1 |

FOREIGN PATENT DOCUMENTS

JP    2001-282763    10/2001

OTHER PUBLICATIONS

Microsoft Solution for Systems Architecture Internet Data Center 2000 Version 1.5.*
"Transaction Processing: Concepts and Techniques", J. Gray et al, Morgan Kaufmann Publishers, 1993.
"Implementing IBM DB2 Universal Database V8.1 Enterprise Server Edition with Microsoft Cluster Server", by Aslam Nomani, IBM, Jan. 2003.

* cited by examiner

*Primary Examiner*—John R. Cottingham
*Assistant Examiner*—Mariela D Reyes
(74) *Attorney, Agent, or Firm*—Brundidge & Stanger, P.C.

(57) ABSTRACT

In a system that switches multiple database servers to separate computers, a switching order of the database servers is variably changed and set. In the system that allows an executive system computer and a standby system computer having the database servers to share a database respectively, the system is switched from the database server of the executive system computer to the database server of the standby system computer. Information (order information) that indicates an order in which the system of the executive system database server is switched is registered in a storage device. The order information is changed by detection of the occurrence of an event in the executive system computer. The system switching processing is performed from the executive system database server to the standby system database server in accordance with the changed order information.

6 Claims, 12 Drawing Sheets

FIG. 10A

| SWITCHING ORDER | DATABASE SERVER |
|---|---|
| 1 | DATABASE SERVER a |
| 2 | DATABASE SERVER b |
| 3 | DATABASE SERVER c |

FIG. 10B

| SWITCHING ORDER | DATABASE SERVER |
|---|---|
| 1 | DATABASE SERVER b |
| 2 | DATABASE SERVER c |
| 3 | DATABASE SERVER a |

FIG. 10C

| SWITCHING ORDER | DATABASE SERVER |
|---|---|
| 1 | DATABASE SERVER c |
| 2 | DATABASE SERVER a |
| 3 | DATABASE SERVER b |

FIG. 10D

| SWITCHING ORDER | DATABASE SERVER |
|---|---|
| 1 | DATABASE SERVER a |
| 2 | DATABASE SERVER b |
| 3 | DATABASE SERVER c |

FIG. 11

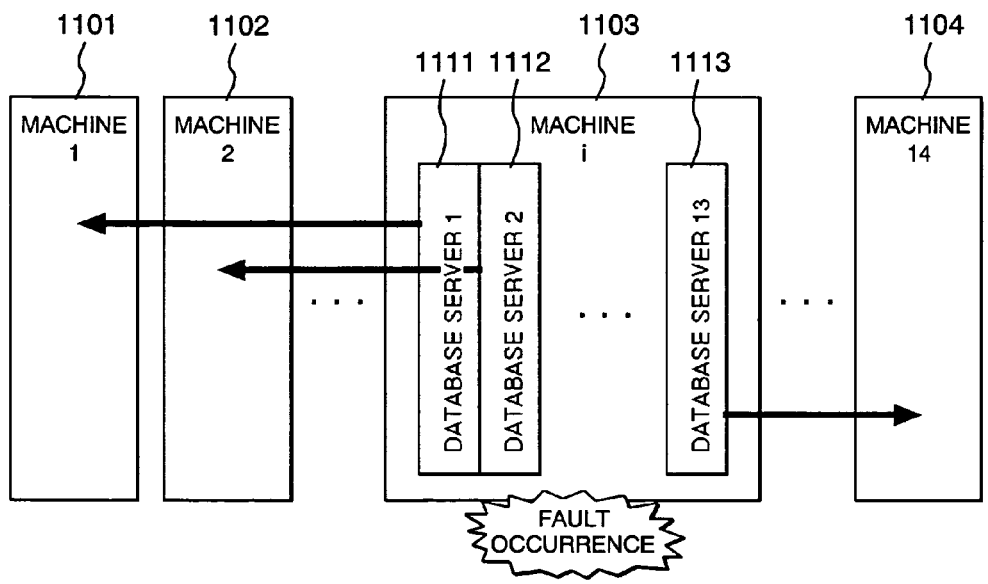

FIG. 12

| DATABASE SERVER NAME | CHECKPOINT OCCURRENCE TIME | NUMBER OF LOGS TO BE REFERRED TO FOR RECOVERY | REQUIRED DB RECOVERY |
|---|---|---|---|
| DATABASE SERVER 1 | 15:12:28 | 100 LOGS | 1 SECOND |
| DATABASE SERVER 2 | 15:12:27 | 200 LOGS | 2 SECONDS |
| DATABASE SERVER 3 | 15:12:26 | 300 LOGS | 3 SECONDS |
| DATABASE SERVER 4 | 15:12:25 | 400 LOGS | 4 SECONDS |
| DATABASE SERVER 5 | 15:12:24 | 500 LOGS | 5 SECONDS |
| DATABASE SERVER 6 | 15:12:23 | 600 LOGS | 6 SECONDS |
| DATABASE SERVER 7 | 15:12:22 | 700 LOGS | 7 SECONDS |
| DATABASE SERVER 8 | 15:12:21 | 800 LOGS | 8 SECONDS |
| DATABASE SERVER 9 | 15:12:20 | 900 LOGS | 9 SECONDS |
| DATABASE SERVER 10 | 15:12:19 | 1000 LOGS | 10 SECONDS |
| DATABASE SERVER 11 | 15:12:18 | 1100 LOGS | 11 SECONDS |
| DATABASE SERVER 12 | 15:12:17 | 1200 LOGS | 12 SECONDS |
| DATABASE SERVER 13 | 15:12:16 | 1300 LOGS | 13 SECONDS |

FIG. 13

| DATABASE SERVER 1 |
| DATABASE SERVER 2 |
| DATABASE SERVER 3 |
| DATABASE SERVER 4 |
| DATABASE SERVER 5 |
| DATABASE SERVER 6 |
| DATABASE SERVER 7 |
| DATABASE SERVER 8 |
| DATABASE SERVER 9 |
| DATABASE SERVER 10 |
| DATABASE SERVER 11 |
| DATABASE SERVER 12 |
| DATABASE SERVER 13 |

FIG. 14

| DATABASE SERVER 13 |
| DATABASE SERVER 12 |
| DATABASE SERVER 11 |
| DATABASE SERVER 10 |
| DATABASE SERVER 9 |
| DATABASE SERVER 8 |
| DATABASE SERVER 7 |
| DATABASE SERVER 6 |
| DATABASE SERVER 5 |
| DATABASE SERVER 4 |
| DATABASE SERVER 3 |
| DATABASE SERVER 2 |
| DATABASE SERVER 1 |

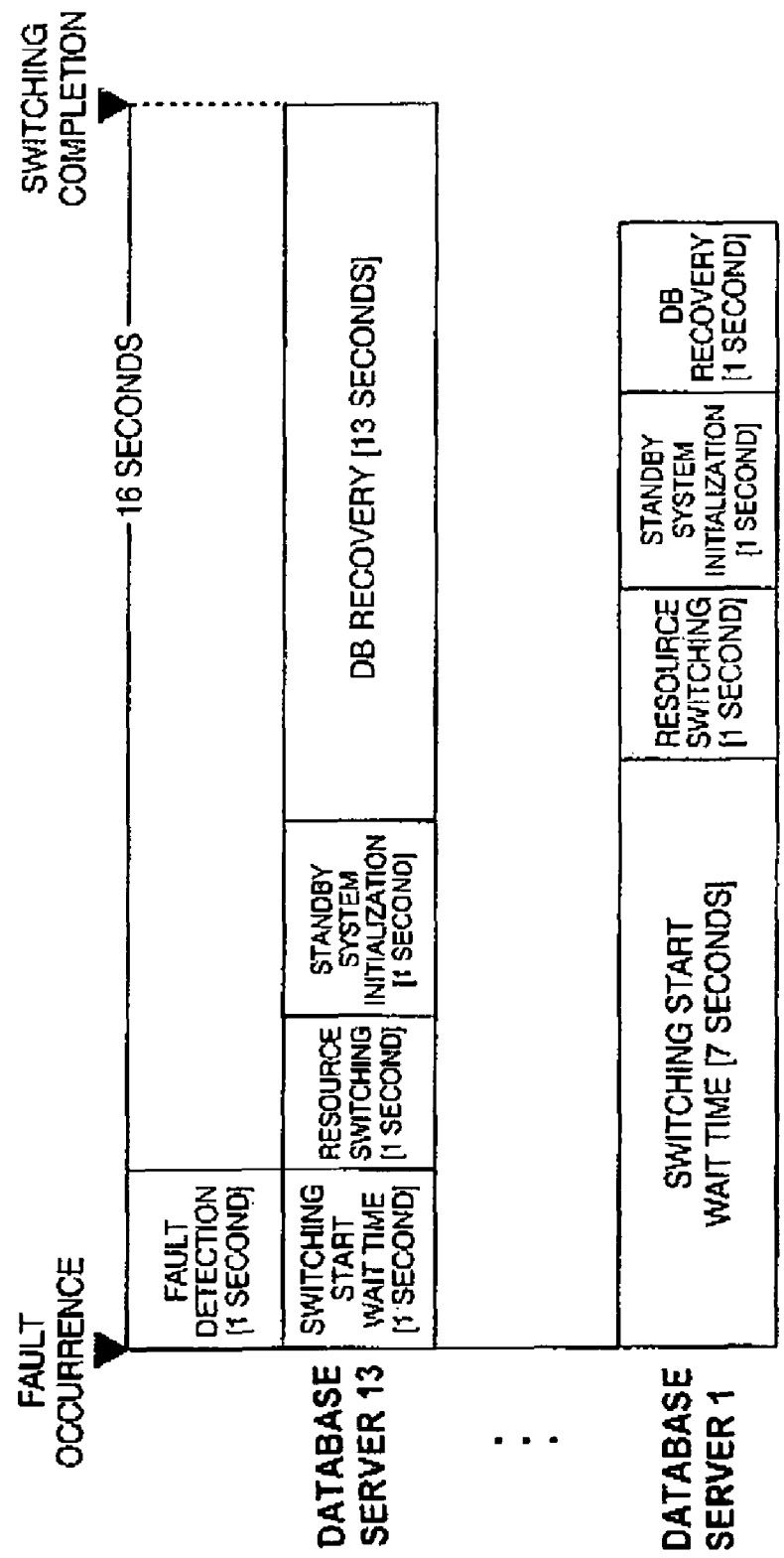

SYSTEM AND METHOD FOR HIGHLY AVAILABLE DATA PROCESSING IN CLUSTER SYSTEM

CLAIM OF PRIORITY

The present application claims priority from Japanese application serial No. 2003-426378, filed on Dec. 24, 2003 and No. 2004-246091, filed on August 26, the content of which are hereby incorporated by reference into this application.

BACKGROUND OF THE INVENTION

The present invention relates to a system switching control method, and, more particularly, to a switching control method of a database server when a fault occurred in a database management system, and, furthermore, to database recovery processing.

A system switching technique is adopted as a means of improving the availability of a database management system. The system switching technique recovers system processing by switching processing of a machine (otherwise, a computer or an information processing unit, or a server) in which a fault occurred to another machine, and reduces a service stop time caused by the fault.

In a database management system to which system switching control is applied, a machine that functions as a switching target for a fault for every machine that executes a service is defined. When the database management system detects the fault of an executive system (application system) machine, the system is switched to a standby system machine. As this type of technique, for example, such a technique disclosed in Japanese Published Unexamined Patent Application No. 2001-282763 is available.

The system switching first allows an executive system resource, for example, a disk that stores a database or a network address to be switched to a standby system machine. When the resource switching is completed, the standby system executes database recovery processing with reference to a log of the database which a database server inherited from an executive system. When the database recovery processing is completed, the standby system starts service acceptance and functions as the executive system, then completes the system switching. A technique like this is described in "TRANSACTION PROCESSING: CONCEPTS AND TECHNIQUES" by Jim Gray and Andreas Reuter, Morgan Kaufmann Publishers, 1993.

When multiple database servers apply system switching to a database management system that operates on the same machine, the multiple database servers on the machine in which a fault occurred are mostly switched to separate machines. When multiple machines share and inherit the processing of the machine in which a fault occurred, a load that appears during the fault is dispersed, a load increase in a switching target machine is suppressed. A technique like this is described in "Implementing IBM DB2 Universal Database V8.1 Enterprise Server Edition with Microsoft Cluster Server" by Aslam Nomani, International Business Machines Corporation, 2003, FIG. 16 (Pages 40 and 41) [online], [Retrieved on Dec. 19, 2003], <http://www-306.ibm.com/software/data/pubs/papers/esemcs/e semcs.pdf>.

SUMMARY OF THE INVENTION

Also, in order to improve the availability of a system, preferably, it is desirable to reduce as much system switching time as possible, and to reduce service stop time of the system. The time required for the switching of a single database server (otherwise, database management system or database management program) varies depending a state of a database. It is because, in the database server switching processing, resource switching processing and database recovery processing are executed while, in these types of processing, the time required for the database recovery processing depends on a condition of the database server for fault occurrence.

Database recovery processing reflects an update result of a database until a fault occurrence point in the database on an external storage device (otherwise, storage device or storage, or storage area). Usually, the database update result is first stored on a buffer (otherwise, cache memory or memory, or storage area) secured on a main storage device. When buffer information can be found on the buffer as long as possible, an input and output processing overhead with the external storage device is reduced. Access time is required for a long time. Accordingly, when a fault occurred, the update result that is not reflected in the database on the external storage device can be found. When the fault occurred, the contents of update that are not reflected in the database on the external storage device must be reflected in the database on the external storage device to recover the database in the state before the fault occurred.

A log is used to reflect the contents of database update in the database on the external storage device. The contents of database update are recorded as the log stored in a nonvolatile storage device, such as the external storage device. When a fault occurs, the update processing is rerun with reference to the log, the update result is reflected in the database on the external storage device, and the database is recovered accordingly.

The time required for database recovery processing varies depending on a change in the number of logs to which a database server refers to in recovery processing. On the other hand, when multiple database servers are switched to separate machines, the switching processing of each database server is started on the machine of a switching source by a single server sequentially, and, subsequently, is inherited to each switching target machine, then executed in parallel. Accordingly, in the system that switches the multiple database servers to the separate machines, the time from fault occurrence to the switching of all the database servers is completed is the switching time of the whole system.

The time from fault occurrence until the switching of each database server is completed is the sum of the time until the switching of the database server is started after the fault occurred and the time required for the switching processing of the database server. Accordingly, in order to reduce the time until the switching of the last server is completed, that is, the switching time of the whole system, the time from the fault occurrence to the switching start must be reduced preferentially with regard to a server whose switching time of the single server is long. Preferably, the switching should be started in descending order of the time required for the switching processing of the single database server.

The switching time of a single database server depends on the number of logs that is referred to in database recovery processing. Accordingly, in order to reduce the switching time of a system that switches multiple database servers into separate machines, preferably, the switching order of the database server should be changed occasionally according to a variation in the number of logs that is referred to in the database recovery processing.

In a conventional technique, however, because the switching order of a database server is fixed in the order set for system construction, reducing a system switching time has been difficult in consideration of a variation in the number of logs.

One object of the present invention is to reduce a system switching time in a database management system that switches multiple database servers operating on the same machine to separate machines.

Another object of the present invention is to change and set a switching order of a database server in accordance with a change in the number of logs to which the database server refers in recovery processing.

The present invention variably changes and sets a switching order of a database server in a system that switches multiple database servers operating on the same machine to separate machines.

In a preferable example with regard to a system switching control method according to the present invention, the system switching control method switches a system from a database server of an executive system machine to a database server of a standby system machine in the system. The system allows both the execution and standby system machines having the database server respectively to share a database. The system switching control method registers information (order information) that indicates an order in which the system of the executive system database server is registered in a storage device, and detects that an event occurred in the executive system machine. The system switching control method changes the order information by the detection of this event, and performs the switching processing of the system from the database server of the executive system to the database server of the standby system in accordance with the changed order information. To detect the occurrence of the event, preferably, that a checkpoint occurred in the database server of the executive system is detected, and to change order information, the order information is changed so that a switching sequence of the database server in which the checkpoint occurred may follow the switching sequence of another database server. In a preferable example, the system switching control method stores a log file that stores a log generated from the executive system database server in a common storage device, and changes the order information so that the switching order of the database server may be set in accordance with the number of logs of the log file when the event occurred.

Moreover, the switching control method detects that a fault occurred in the executive system, and executes the switching processing when the fault occurrence was detected. Moreover, the switching processing separates a resource related to the database server specified in accordance with the order information, and specifies the database that functions as a standby system switching target. Moreover, the switching control method in a standby system validates a resource that corresponds to the database server to be accepted and executes the database recovery processing with reference to the log file.

The present invention can be grasped as a database recovery processing method as well as a system switching control method in this manner.

Moreover, the present invention can also be grasped as a program having the function for implementing the above methods. Furthermore, in a preferable example of the present invention according to a computer system, the computer system includes an executive system machine connected through a network, a standby system machine, and an external storage device having a database shared by the executive system machine and the standby system machine. The external storage device stores a log file that stores a log generated from an executive system database server. The executive system machine is provided with multiple database servers that accept an I/O processing request from a user's information processing unit and execute the I/O processing to the database. The executive system machine is provided with a storage device that registers the information (order information) that indicates an order in which a database is switched into a standby system database server. The executive system machine is provided with a switching order decision unit that changes an order of system switching so as to reduce a system switching time, and in which the changed order is reflected in the order information. The executive system machine is provided with a switching control unit that sequentially separates the database server and issues a switching acceptance request to the standby system machine. The standby system machine is provided with at least a database server that accepts an I/O processing request from the user's information processing unit and executes the I/O processing to the database, and a control unit determines whether a switching instruction is accepted. When the switching instruction is accepted by the switching control unit, the standby system database server executes the database recovery processing with reference to the log file.

At this point, the executive system machine posts that a checkpoint occurred in the database server of the executive system machine. The switching order decision unit accepts a notification from a posting means, and changes order information so that a sequence of the switching start of the database server in which a checkpoint occurred may follow the sequence of at least another database server. In a preferable example, the switching order decision unit changes the sequence of the switching start of the database server according to the number of logs of a log file.

Moreover, the switching order decision unit changes order information so that a sequence of the switching start of the database server in which a checkpoint occurred can be set to be the last.

According to the present invention, a database management system that switches multiple database servers into separate machines can reduce a system switching time of the whole system.

BRIEF DESCRIPTION OF THE DRAWINGS

FIG. 10A is a drawing showing one example of system switching order information in the embodiment;

FIG. 10B is a drawing showing one example of the system switching order information in the embodiment;

FIG. 10C is a drawing showing one example of the system switching order information in the embodiment;

FIG. 10D is a drawing showing the example of the system switching order information in the embodiment;

FIG. 11 is a drawing showing one example of operation when a fault occurred in a system having a blade server in the embodiment;

FIG. 12 is a drawing showing an immediately nearby checkpoint occurrence time of a database server, the number of logs to be referred to for DB recovery, and a time required for the DB recovery in the embodiment;

FIG. 13 is a drawing showing one example of a switching order for system construction in the embodiment;

FIG. 14 is a drawing showing one example of the switching order when the present invention is applied in the embodiment;

FIG. 16 is a drawing showing one example of the details of the system switching time in the embodiment.

DESCRIPTION OF THE PREFERRED EMBODIMENT

The embodiments of the present invention are described in detail below with reference to the drawings.

Figure 1:
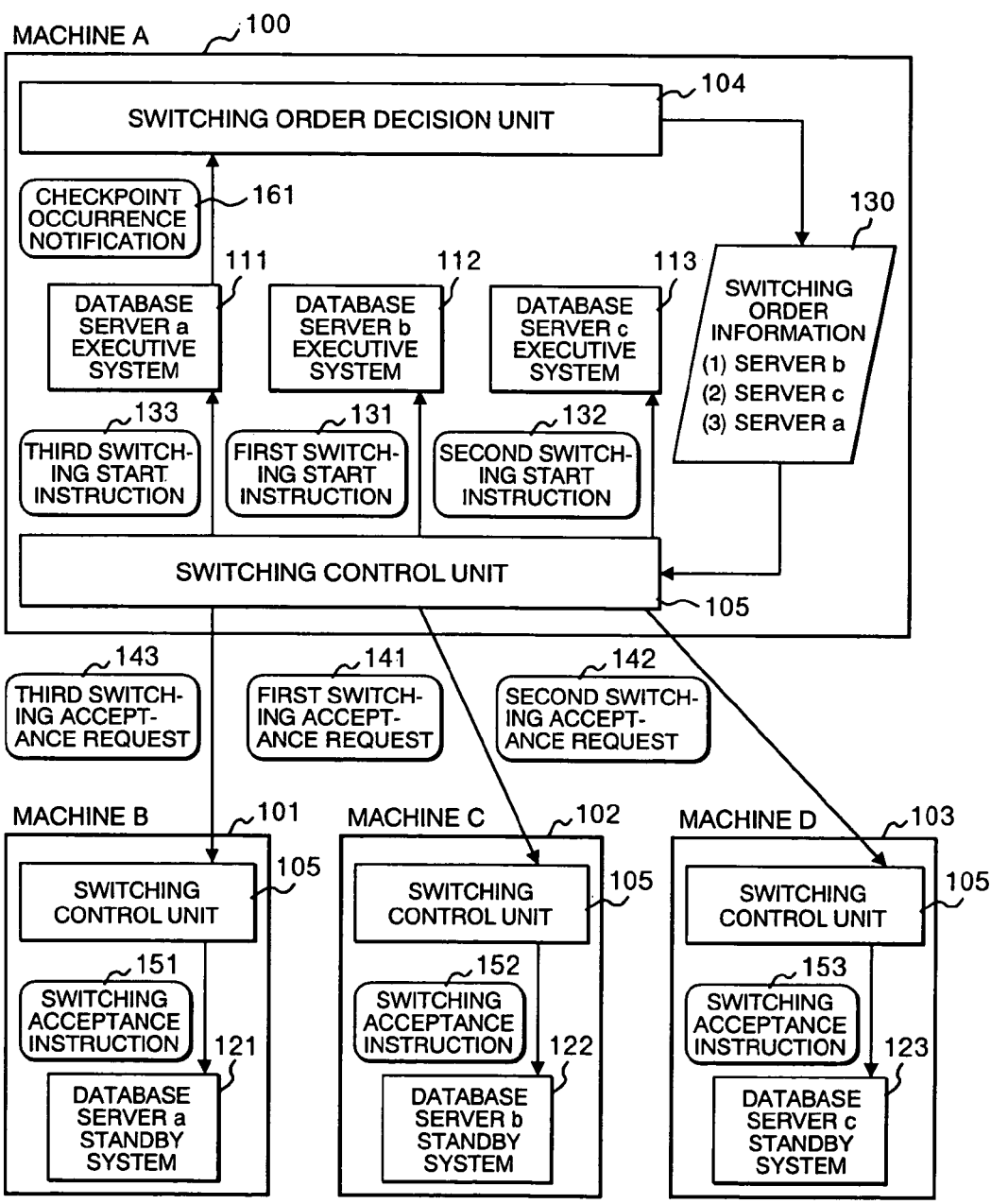
FIG. 1 is a conceptual illustration of a database management system according to one embodiment of the present invention.

FIG. 1 is a drawing showing a concept of a database management system according to one embodiment. This database management system includes multiple machines of a machine A (100), a machine B (101), a machine C (102), and a machine D (103). The machine A (100) is provided with multiple database servers a (111), database servers b (112), and database servers c (113), and these three types of servers are operating as executive systems. The machine A (100), the machine B (101), the machine C (102), and the machine D (103) are a computer or a virtual computer, and otherwise, a program or an object that implements its function. The machine B, C, or D is defined as a standby system machine to the executive system machine A, and is provided with a standby system database server respectively. Needless to say, the standby system machine B (101), C (102), or D (103) may also be assumed to include multiple database servers respectively in the same manner as the executive system machine A. A database server (also referred to as a database management program) is realized with a program or an object, and a process or a thread.

When a hardware or software error such as an OS (operating system) failure or a communication fault occurs in the machine A (100), the processing of the database server a, the database server b, or the database server c operating on the machine A is switched into the machine B, the machine C, or the machine D respectively.

Figure 2:
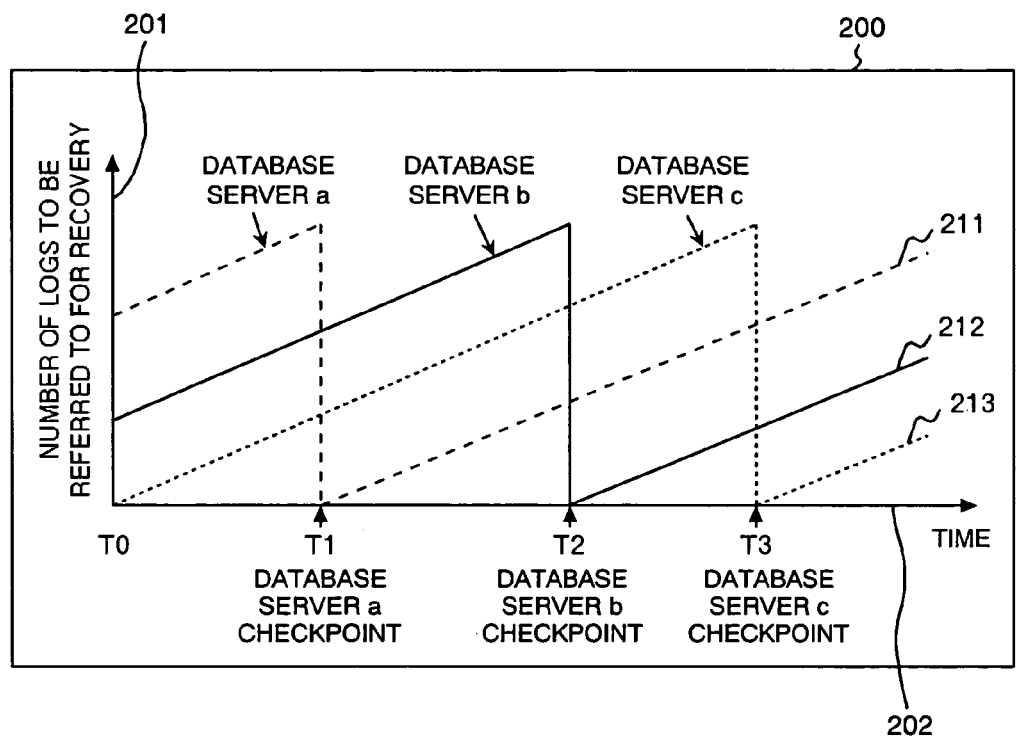
FIG. 2 is a graph showing a change in the number of logs of multiple database servers that is referred to for database recovery processing.

FIG. 2 is a graph showing a change in the number of logs of multiple database servers that is referred to for database recovery-processing. The vertical axis of this graph shows the number of logs (also referred to as a journal or a redo log) that is referred to for database recovery, and the horizontal axis shows a time. A line 211 shows a change with the time of the number of logs that is referred to when the database a refers to for the database recovery. A line 212 shows a change with the time of the number of logs when the database b refers to for the database recovery. A line 213 shows a change with the time of the number of logs when the database c refers to for the database recovery. In the period shown by this graph, a checkpoint of the database server a occurs in a time T1, and a checkpoint of the database server b occurs in a time T2, then a checkpoint of the database server c occurs in a time T3.

At this point, a checkpoint is a period of time in which it is guaranteed that an update result of a database up to the period of time is reflected completely in the database on an external storage device. When the checkpoint occurs, a database server stores the update result stored in a buffer (cache memory) on a main storage is stored in the database on the external storage device, and the database on the external storage device enters the latest state. The database recovery processing for fault occurrence reflects the update result from the latest checkpoint to a fault occurrence period of time. Accordingly, the log the database server refers to in the database recovery processing changes into the log from the latest checkpoint to the fault occurrence period of time. The number of logs to be read is reduced, and the database recovery processing time is reduced.

Incidentally, a description returns to the graph of FIG. 2. As shown in this graph, the number of logs which each database server refers to in recovery processing increases monotonically with a lapse of time. When a checkpoint occurs, the log is updated at that time and is reflected in the database. Accordingly, the number of logs is reduced to zero. For example, the number of logs the database server a refers to for database recovery increases monotonically from a time T0 to the time T1, and is reduced to 0 at the time T1. The number of logs increases monotonically again at the time T1 or later.

FIG. 10A to FIG. 10D show switching order information on the period shown in the graph of FIG. 2. FIG. 10A, FIG. 10B, FIG. 10C, and FIG. 10D show the switching order information on the periods T0 to T1, T1 to T2, T2 to T3, and T3 or later. For example, the switching order for the periods T0 to T1 is arranged in the order of the database server a, the database server b, and the database c, as shown in FIG. 10A. A table that shows a pair of the switching order and database server is stored in an external storage device or a main storage device (FIG. 3) as switching order information 130 of FIG. 1.

In this embodiment, until a fault occurs on the machine A (100), a switching order decision unit 104 executes the switching order decision processing of a database server. When a fault occurs on the machine A (100), a switching control unit 105 executes the switching of the database server in accordance with the switching order information 130 the switching order decision unit 104 decided.

A switching order decision method in the machine A (100) is described. In FIG. 1, the switching order decision unit 104 decides the database switching order on the machine A (100). When the switching order decision unit 104 receives a checkpoint occurrence notification 161 from the database server executive system 111, a sequence of the database server 111 in which a checkpoint occurred is set to be the last, and the switching order of the database server whose switching order was the database server 111 or later is raised sequentially.

For example, the operation when a checkpoint occurred in the database server a at the time T1 of the graph of FIG. 2 is described. The switching order before the checkpoint occurs is arranged in the order of the database order a, the database server b, and the database server c, as shown in FIG. 10A. When the checkpoint of the database server a occurs, the database server a executive system 111 sends the checkpoint occurrence notification 161 to the switching order decision unit 104. When the switching order decision unit 104 receives the checkpoint occurrence notification 161 from the database a executive system 111, the switching order of the database server a is set to be the last. Then the switching order of the database server b is changed from the second to the first, and the switching order of the database server c is changed from the third to the second. As a result, the switching order of the switching order information 130 is arranged in the order of the database server b, the database server c, and the database server a, as shown in FIG. 10B.

At this point, attention is paid to the number of logs each database server refers to in recovery processing at the time T1 of the graph of FIG. 2. In this case, with regard to the database server b and the database server c, the number of logs that is referred to in the recovery processing is continuing a monotonic increase. With regard to the database server a, the number of logs that is referred to in the recovery processing is reduced to zero. Subsequently, the number of logs that is referred to each database server refers to in the recovery processing continues the monotonic increase until the time (T2) at which the checkpoint occurs in the database server b. Accordingly, the switching order of the switching order information 130 is arranged in descending order of the number of logs each database server refers to in the recovery processing.

Next, the switching processing when a fault occurred in the machine A (100) is described. In this case, the switching control unit 105 detects the fault of the machine A (100) and controls the switching of a database server. The switching control unit 105 starts the switching of the database server in the order shown in the switching order information 130 generated by the switching order decision unit 104.

For example, when a fault occurred between the times T1 and T2, the switching order of the switching order information 130 is arranged in the order of the database server b, the database server c, and the database server a, as shown in FIG. 10B. Accordingly, the switching control unit 105, first, issues a switching start instruction 131 to the database server b executive system 112, and issues a switching acceptance request 141 to the switching control unit 105 of the machine C (102). Next, the switching control unit 105 issues a switching start instruction 132 to the database server c executive system 113, and issues a switching acceptance request 142 to the switching control unit 105 of the machine D (103). Finally, the switching control 105 issues a switching start instruction 133 to the database server a executive system 111, and issues a switching acceptance request 143 to the switching control unit 105 of the machine D (103).

A machine that accepted a switching acceptance request issues a switching acceptance instruction to the database server standby system on the machine. In the case of the example of FIG. 1, in the machine B (101), the switching control unit 105 issues a switching acceptance instruction 151 to a database server a standby system 121. In the machine C (102), the switching control unit 105 issues a switching acceptance instruction 152 to a database server b standby system 122. In the machine D (133), the switching control unit 105 issues a switching acceptance instruction 153 to the database server c standby system 123.

Each of the database server standby systems 121 to 123 that accepted a switching acceptance instruction accepts the processing of the corresponding database server, for example, accepts an application processing request, and accepts the execution of the processing from an executive system. In the case of the example of FIG. 1, the database server a standby system 121 inherits the processing of the database server a from the database server a executive system 111. Moreover, the database server b standby system 122 inherits the processing of the database server b from the database server b executive system 112. The database server c standby system 123 inherits the processing of the database server c from the database server c executive system 113. These types of processing are executed on each machine in parallel.

At this point, with reference to the periods T1 to T2 of the graph of FIG. 2, the number of logs each database server refers to in database recovery processing is small in the order of the database server b, the database server c, and the database server a. Accordingly, the time required for the database recovery processing is short in the order of the database server b, the database server c, and the database server a.

Accordingly, in the sequence shown in the switching information 130 generated by the switching order decision unit 104, the switching control unit 105 starts the database switching. Since system switching can be started preferentially from the database whose switching time is long (that is, a great number of logs), the switching time of the whole system can be reduced.

Further, in case of the above example, the standby database servers 121 to 123 are arranged in each of the three different machine B (101), the machine C (102), and the machine D (103) as the standby system of the executive system machine A. However, the executive system database server and the standby database server can also be arranged in a machine, for example, in the machine A.

Figure 3:
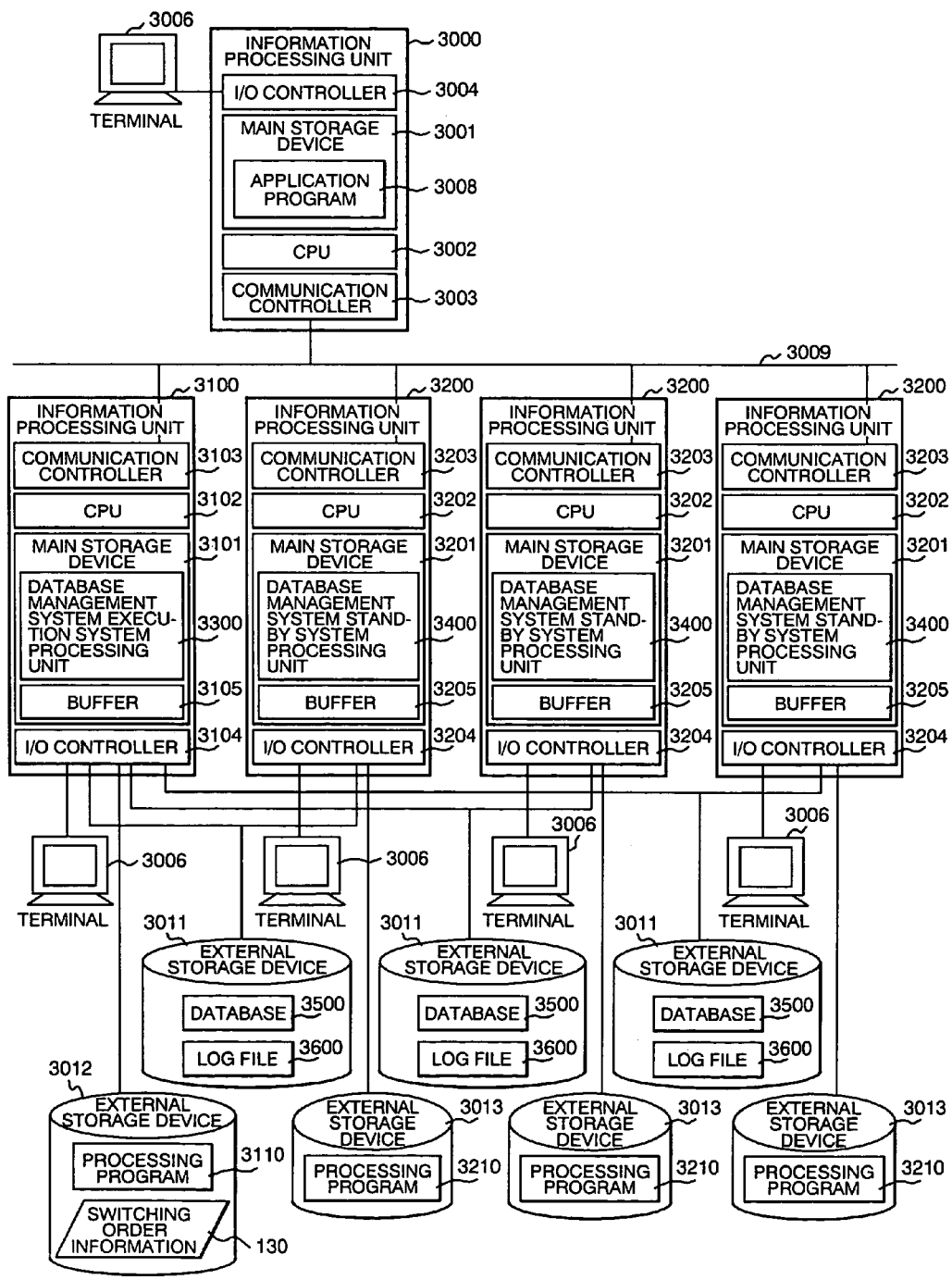
FIG. 3 is a drawing showing a configuration example of a computer system to which the embodiment is applied.

FIG. 3 is a drawing showing a configuration example of a computer system to which one embodiment is applied. This computer system includes control processing units 3000, 3100, and 3200. The information processing unit 3000 is connected to the information processing units 3100 and 3200 through a network 3009. At this point, the processing unit 300 is a client, and the information processing units 3100 and 3200 function as servers.

The information processing unit 3000 is provided with a CPU 3002, a main storage device 3001, a communication controller 3003, an I/O controller 3004, and a terminal 3006. The main storage device 3001 stores an application program 3008, and this program 3008 is executed by the CPU 3002. When the application program 3008 makes an inquiry into the information processing unit 3100 or 3200, the communication controller 3003 of the information processing unit 3000 and a communication controller 3103 or 3203 of the information processing unit 3100 or 3200 sends a request inquiry to a database management system through the network 3009.

The information processing unit 3100 is provided with a CPU 3102, a main storage device 3101, the communication controller 3103, an I/O controller 3104, external storage devices 3011 or 3012 such as a magnetic disk unit, and the terminal 3006. The main storage device 3101 stores a program having the database management system executive system processing unit 3300, and this program is executed by the CPU 3002. Moreover, a buffer (that is, a cache memory) 3105 used for accessing to a database is also arranged in the main storage device 3101. A database 3500 and a log file 3600 a database management system manages are stored on the external storage device 3011. A processing program 3110 that realizes the database management executive system processing unit 3300 and a table of the switching order information 130 are stored on the external storage device 3012. The database management executive system processing unit 3300 reads and writes data from and to the external storage devices 3011 and 3012 by the I/O controller 3104, and sends and receives the data with another information processing unit through the network 3009 by the communication controller 3103. Moreover, the database management system executive system processing unit 3300 sends a switching acceptance request to the information processing unit 3002 connected through the network 3009 by the communication controller 3103.

The information processing device 3200 is provided with a CPU 3202, a main storage device 3201, a communication controller 3203, an I/O controller 3204, the external storage devices 3011 or 3013 of a magnetic disk, and the terminal 3006. The main storage device 3201 stores a program of a database management system standby system processing unit 3400, and the program is executed by the CPU 3202. Moreover, a buffer 3005 used for accessing to a database is arranged in the main storage device 3201. The database 3500 and the log file 3600 managed by the database management system are stored on the external storage device 3011. A processing program 3210 that realizes the database management system standby system processing unit 3400 is stored on the external storage device 3013. The database management system standby system processing unit 3400 reads and writes data from and to the external storage devices 3011 and 3013 by the I/O controller 3204, and sends and writes the data with the information processing device connected through the network 3009 by the I/O controller 3204. Moreover, the database management system standby system processing unit 3400 receives a switching acceptance request from the information processing unit 3001 connected through the network 3009 by the communication controller 3203.

At this point, the external storage device 3011 is a shared disk, and is associated with both the executive system information processing unit 3200 and the standby system information processing unit 3100. The external storage device 3011 stores the database 3500 and the log file 3600 a database server that corresponds to the data base management system standby system processing unit 3400 arranged in the information processing unit 3200. When the corresponding database server is not switched, the base management system executive system processing unit 3300 manages the database 3500 and the log file 3600. On the other hand, when the database server is switched, the database management system standby system processing unit 3400 manages these database and file. The database 3500 perpetually or temporarily stores the data to be accessed in this database management system. Moreover, the log file 3600 perpetually or temporarily stores a log that records the update contents of the database 3500. Further, a disk storing a database or a network address can be found as a resource to be switched.

Figure 4:
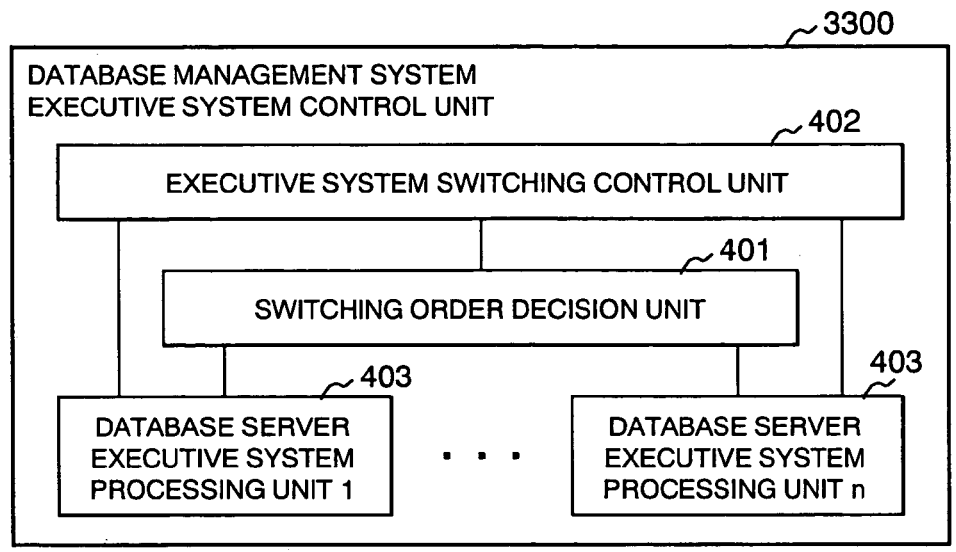
FIG. 4 is a drawing showing a functional configuration of an executive system processing unit 3300 of the database management system in the embodiment.

FIG. 4 shows a functional configuration of the database management system execution processing unit 3300. The database management system executive system processing unit 3300 is provided with a switching order decision unit 401, an executive system switching control unit 402, and a database server executive system processing unit 403. The database server executive system processing unit 403 includes multiple executive system processing units, which are arranged only for the number of database servers operating on a machine. Each of processing units 1 to n is a processing unit of software that can process input and output (I/O) data, for example.

The switching order decision unit 401 receives the checkpoint occurrence notification 161 sent from the database server executive system processing unit 403, and decides the switching order of multiple database servers. The decided switching order is recorded as the switching order information 130.

The executive system switching controller 402 controls the switching of a database server. When a fault is detected in a machine that constructs a database management system, first, a switching start instruction is sent to the database server executive system processing unit 403 operating on the machine. Next, a resource that corresponds to each database server is separated, and a switching acceptance request is sent to the standby system switching control unit of the machine in which the corresponding database server standby system processing unit is arranged in the database server executive system processing unit 403.

The database server executive system processing unit 403, when the corresponding database server is not switched, accepts an inquiry entered from the application program 3008, and accesses to the database 3500 stored on an external storage device, then returns an access result to the application program 3008 as occasion demands. When a checkpoint occurs in a database server, the checkpoint occurrence notification 161 is sent to the switching order decision unit 401. Moreover, when a switching start instruction is received from the executive system switching control unit 402, switching is started.

Figure 5:
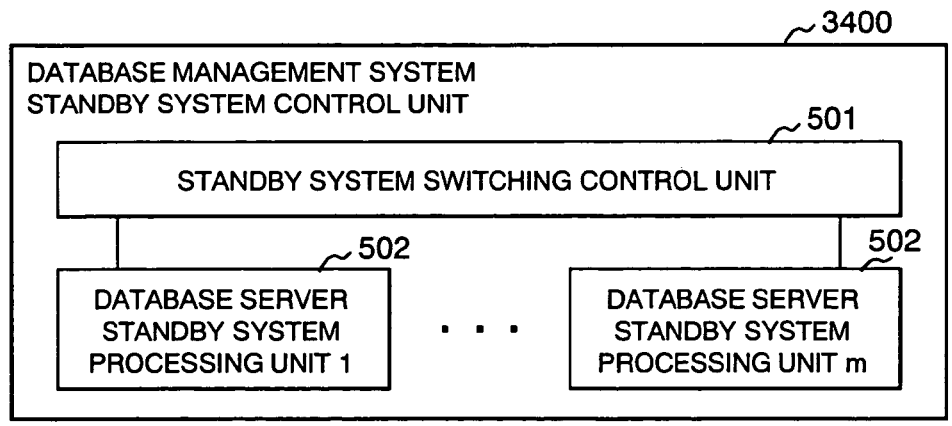
FIG. 5 is a drawing showing the functional configuration of a standby system processing unit 3400 of the database management system in the embodiment.

FIG. 5 shows a functional configuration of the database management system standby processing unit 3400. The database management system standby processing unit 3400 is provided with a standby system switching control unit 501 and a database server standby system processing unit 502. There are arranged as many of the database server executive system processing units 403 as database servers operating on a machine when a fault occurred.

The standby system switching control unit 501 controls the switching of a database server in a standby system. When a switching acceptance request is received from the executive system switching control unit 402, a resource that corresponds to the database server to be accepted is validated. Next, a switching acceptance instruction is sent to the database server standby system processing unit 502 that corresponds to the database server.

The database server standby system processing unit 502, when the corresponding database server is switched, alternates the processing of the corresponding database server executive system processing unit 403. That is, the processing unit 502 accepts an inquiry entered from the application program 3008, and accesses to the database 3500 stored on an external storage device, then returns an access result to the application program 3008 as occasion demands. Moreover, when the processing unit 502 receives a switching acceptance instruction from the standby system switching control unit 501, the processing unit 502 accepts the switching of a database server, and executes database recovery processing.

Figure 6:
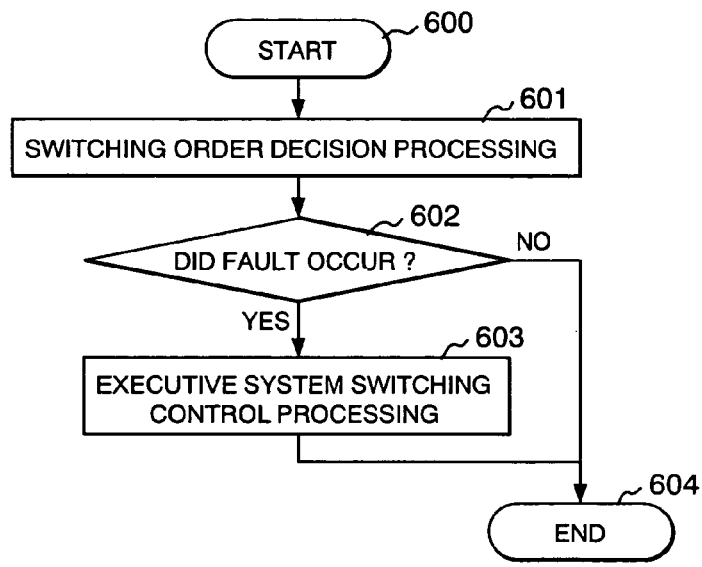
FIG. 6 is a flowchart showing a processing procedure of the executive system processing unit 3300 of the database management system in the embodiment.

FIG. 6 is a flowchart showing a processing procedure with regard to the system switching of the database management system executive system processing unit 3300. First, switching order decision processing is executed by the switching order decision unit 401 (601). Next, whether or not a fault is occurring in the database executive system processing unit 403 (existence of the fault) is determined (602). When the fault is not occurring, processing is terminated (604). When the fault is occurring, executive system switching control processing is executed by the executive system switching control unit 402 (603). When the execution of this processing is terminated, the processing is terminated (604). Further, the processing of the switching order decision unit 401 is described later with reference to FIG. 7, and the processing of the executive system switching control unit 402 is described later with reference to FIG. 8.

Figure 7:
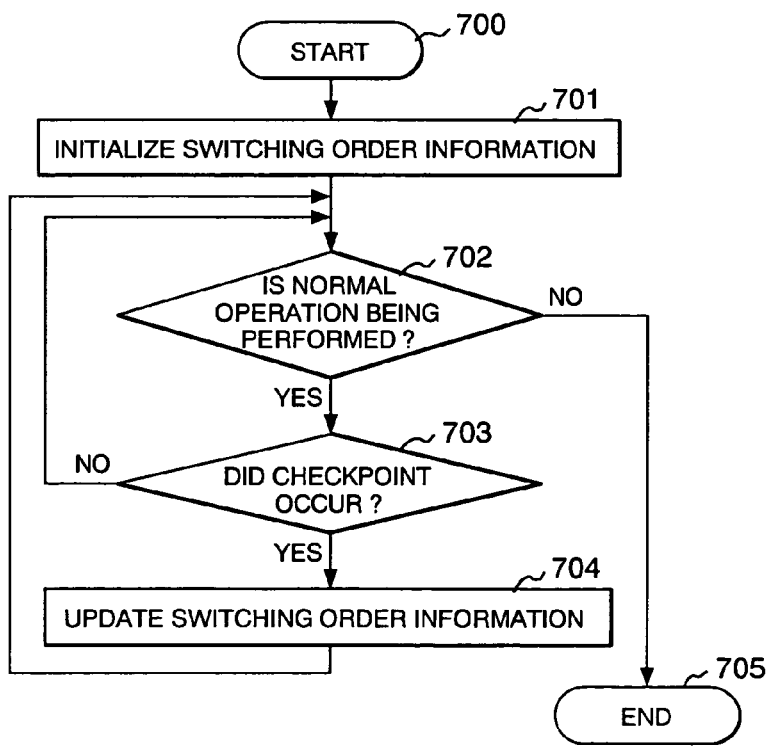
FIG. 7 is a flowchart showing the processing procedure of switching order decision processing in the embodiment.

FIG. 7 is a flowchart showing the processing procedure of the switching order decision unit 401. First, the switching order information 130 is initialized (701). With regard to the switching order information 130 to be generated, the initial value is decided based on the order in which a database was registered for system construction.

Next, whether a database system is operating normally is determined (702). When the database system is not operating normally, processing is terminated (705). On the other hand, when the system is operating normally, whether a checkpoint is occurring in the database server is determined (703). As a result of this determination, when the checkpoint is not occurring, the processing returns to a step 702. When the checkpoint is occurring, the switching order information is updated (704). The existence of checkpoint occurrence is determined as to whether the checkpoint occurrence notification 161 has been sent from the database server executive system processing unit 403.

In the update processing (704) of the switching order information 130, specifically, a switching sequence of a database server in which a checkpoint occurred is set to be the last, and the switching sequence of the database server whose switching order is later than the switching sequence of the database server is raised sequentially. When this update processing is completed, the processing returns to the step 702.

Figure 8:
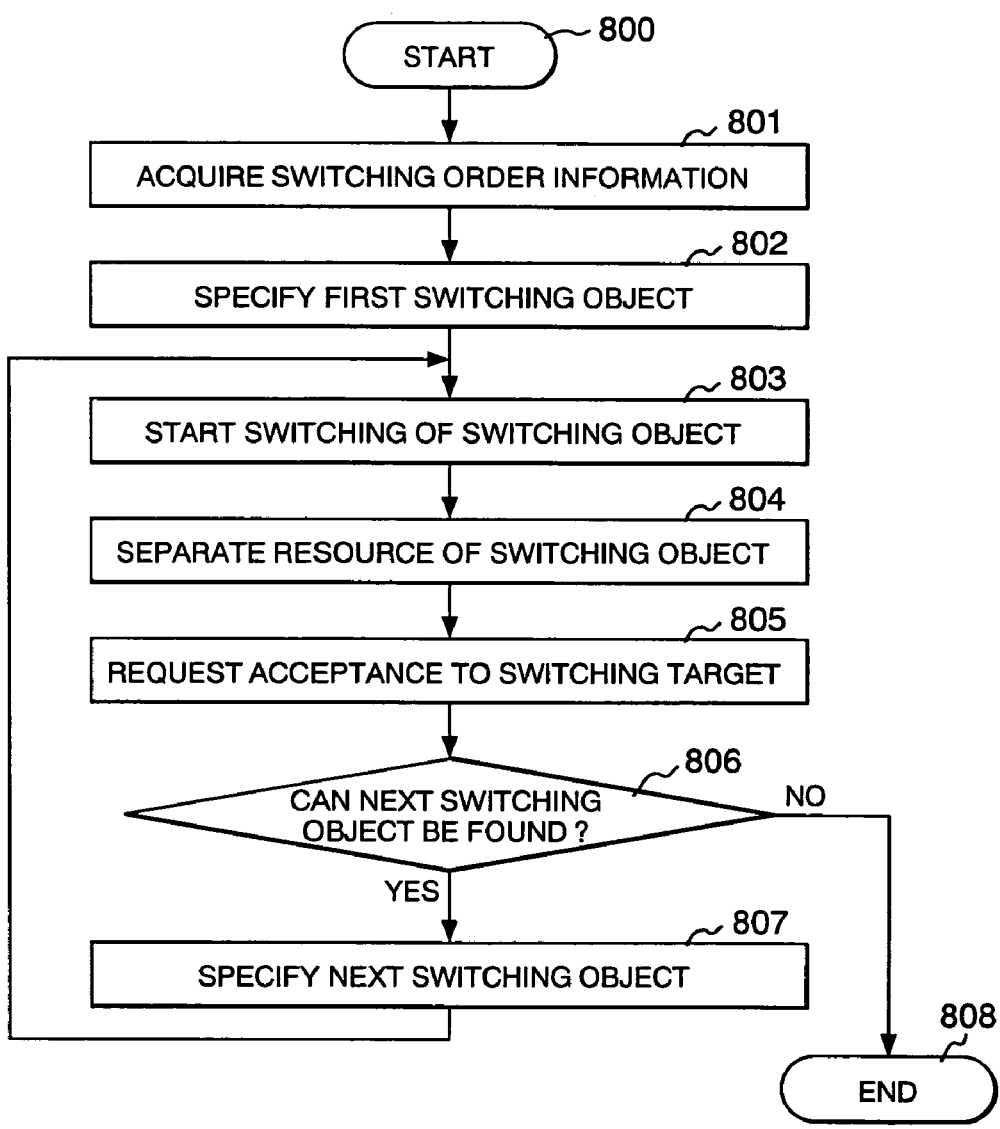
FIG. 8 is a flowchart showing the processing procedure of executive system switching control processing in the embodiment.

FIG. 8 is a flowchart showing the processing procedure of the executive system control unit 402. First, the switching order information is acquired (801), and an object to be switched at first is specified (802), then processing proceeds to a step 803. Next, a switching start instruction is issued to the database executive system processing unit 403 of a switching object database server (803), and a resource that corresponds to the database server is separated (804). Then a switching acceptance request is sent to the standby system switching control unit 501 of a switching target machine (805).

Whether the next switching object database server can be found is determined (806). As a result of the determination, when a switching object database server can be found, the next switching object is specified (807), and, subsequently, the processing returns to step 803. On the other hand, when the switching object database server cannot be found, the processing is terminated (808).

The processing procedure regarding the system switching of the database management system standby system processing unit 3400 in this embodiment is as follows. First, in the standby system switching control unit 501, standby system switching control processing is executed. Subsequently, the database server standby system processing unit 502 accepts the switching of a database server, and executes the database server recovery processing, then completes switching processing.

Figure 9:
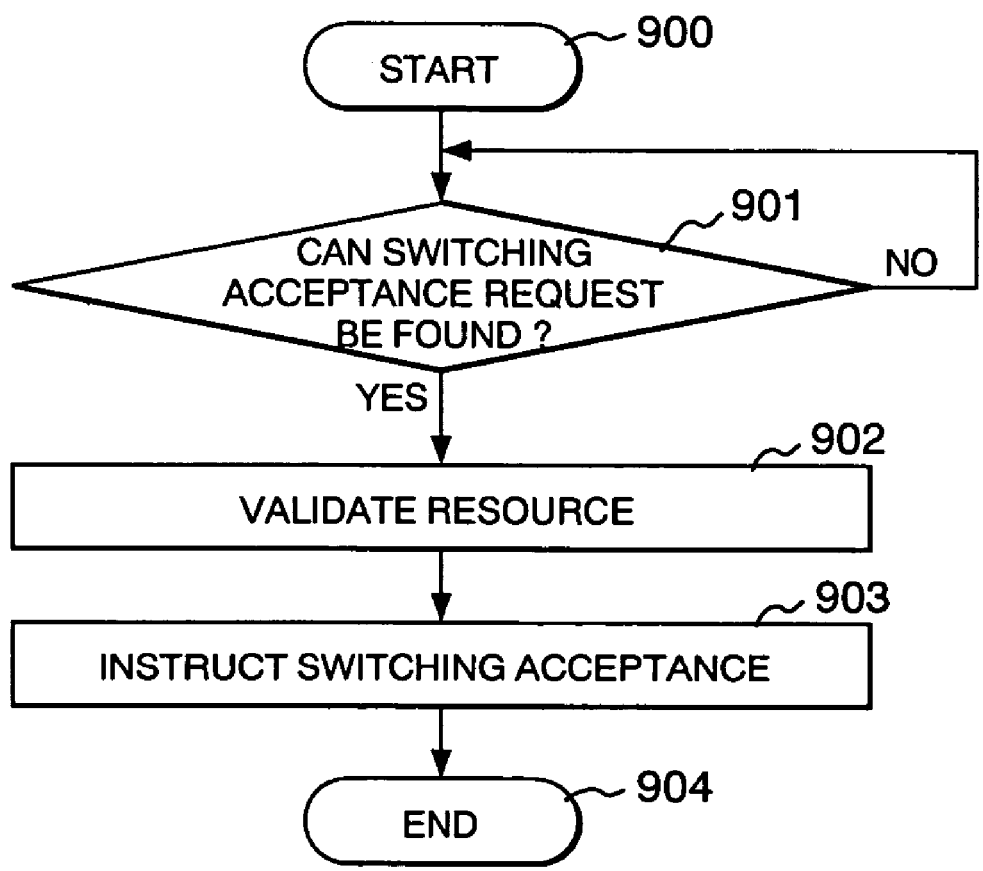
FIG. 9 is a flowchart showing the processing procedure of standby system switching control processing in the embodiment.

At this point, the processing procedure of the standby switching control unit 501 is described with reference to the flowchart shown in FIG. 9. First, the existence of a switching acceptance request is determined (901). The existence of the switching acceptance request is determined by whether the switching acceptance request is reached from the executive system switching control unit 402.

As a result of this determination, when a switching acceptance request cannot be found, the step 901 is repeated. On the other hand, when the switching acceptance request can be found, a resource that corresponds to a database server to be accepted is validated (902). That is, an address is set so that accessing may be enabled from a standby system database server to an external storage device in which a database is stored. Next, a switching acceptance instruction is sent to the database server standby processing unit 502 (903), and processing is terminated (904).

Next, a processing procedure regarding the system switching of the database server standby processing unit 502 is described. As the procedure, first, the processing unit 502 receives a switching acceptance instruction from the standby system switching control unit 501. Next, the processing unit 502 executes the recovery processing of the database 3500 with reference to the log file 3600 of a database server to be accepted.

Next, a shift in the relationship between the number of logs and system switching order the database server standby system processing unit 502 refers to in database recovery processing with reference to FIG. 2 and FIGS. 10A to 10D is described.

For example, when a fault occurs between the periods T1 and T2, a switching control unit starts the switching of a database server in the switching order of FIG. 10B. That is, the switching control unit starts the switching in the order of the database server b, the database server c, and the database server a. At this time, the number of logs each database refers to in the database recovery processing is reduced in the order of the database server b, the database server c, and the database server a, as shown in FIG. 2.

The switching order before a checkpoint occurs at the time T2 of the graph of FIG. 2 is arranged in the order of the database server b, the database server c, and the database server a, as shown in FIG. 10B. When the checkpoint occurs in the database server b, the switching order of the database server b is set to be the last, and the switching order of the database server c is changed from the second order to the first, then the switching order of the database server a is changed from the third order to the second. As a result, the switching order of the switching order information 130 is arranged in the order of the database server c, the database server a, and the database server b, as shown in FIG. 10C.

Accordingly, when a fault occurs between the periods T2 and T3, the switching control unit starts the switching of a database server in the switching order of FIG. 10C. That is, the switching control unit starts the switching in the order of the database server c, the database server a, and the database server b. At this time, the number of logs each database refers to in database recovery processing is reduced in the order of the database server c, the database server a, and the database server b, as shown in FIG. 2.

FIG. 11 and FIG. 12 are drawings showing details of the system switching time of the whole system in this embodiment. The system switching time of the whole system is the time until the switching of the database server a, the database server b, and the database server c is completed from a fault occurrence period of time. The time from the fault occurrence until the switching of each database server is completed is the sum of the time until the switching of the database server is started after the fault occurs, the time required for the switching of a resource regarding the database server, the time required for the initialization of a standby system, and the time required for DB recovery. The time until the switching of the database server is started after the fault occurred depends on the system switching start order. In the case of a database server whose switching order is first, the time is equal to a system fault detection time of 1 second. In the case of a database server whose switching order is second, the time is the sum of the system fault detection time of 1 second and the time of 1.5 seconds until the processing in the machine A (100) of the resource switching processing regarding the second server is completed, which amounts to 2.5 seconds. In the case of a database server whose switching order is third, the time is the sum of the system fault detection time of 1 second, the time of 1.5 seconds until the processing in the machine A (100) of the resource switching processing regarding the first server is completed, and the time of 1.5 seconds until the processing in the machine A (100) of the resource switching processing regarding the second server is completed, which amounts to 4 seconds. The time required for the DB recovery is proportional to the number of logs that is referred to for the DB recovery. For example, when a fault occurred between the periods T2 and T3 of FIG. 2, the time is prolonged in the order of the database server b, the database server a, and the database server c.

Next, the system switching time of the whole system when the whole system is applied to an environment in which many servers can be found, such as a blade, is described.

FIG. 11 is a drawing showing an example of the system switching operation when a fault occurred in a system provided with a blade server. The system includes 14 machines from a machine 1 (1101) to a machine 14 (1104), and 13 database servers from a database server 1 (1111) to a database server 13 (1113) are arranged in a machine i (1103) that is the ith machine. In this system, when a fault occurs in the machine i (1103), the 13 database servers on the machine i (1103) are switched into 13 machines other than the machine i (1103) in the system. At this time, usually, the number of database servers switched into one machine is 1 to equalize each machine load after switching. That is, the database server on the machine i (1103) and a switching target machine establishes a correspondence relationship of 1 to 1.

FIG. 12 is a drawing showing an immediately nearby checkpoint occurrence time of each database server, the number of logs that is referred for DB recovery, and a time required for the DB recovery in an operation example for the fault occurrence shown in FIG. 11. The immediately nearby checkpoint occurrence time is the latest at 1512 hours and 28 seconds for the database server 1, and the earliest at 1512 hours and 16 seconds for the database server 13. The number of logs that is referred to for the DB recovery is the smallest 100 logs for the database server 1, and the greatest 1,300 logs for the database server 13. This is because the time required for the DB recovery is proportional to the number of logs that is referred to for the DB recovery.

FIG. 13 is a drawing showing a switching order specified for system construction. The switching order is arranged in the order of the database server 1, the database server 2, and the database server 3, and the database server 13 is final.

FIG. 14 is a drawing showing a switching order when a switching order method according to this embodiment is applied in an operation example for the fault occurrence shown in FIG. 11. Since the switching order is in ascending order of an immediately nearby checkpoint occurrence time, the switching order is arranged in the order of the database server 13, the database server 12, and the database server 11, and the database server 1 is the last.

The description goes back to the system switching time of the whole system. The system switching time of the whole system is the time from a fault occurrence point of time until the switching of all database servers (the database server 1 to the database server 13) is completed. The time from fault occurrence until the switching of each database server is completed is the sum of the time until the switching of the database server is started after the fault occurred, the time required for the switching of a resource regarding the database server, the time required for the initialization of a standby system, and the time required for DB recovery.

The time until the switching of a database server is started after the fault occurred depends on system switching start order. In the case of the database server whose switching order is first, the time is equal to a system fault detection time of 1 second. In the case of the database server is second, the time is the sum of the system fault detection time of 1 second, and the time of 0.5 second until the processing in the machine i (1103) of the resource switching processing regarding the first server, which amounts to 1.5 seconds.

In the case of the database server whose switching order is 13th, the time is the sum of the system fault detection time of 1 second, and the time of 6 seconds (0.5 second multiplied by 12) until resource switching processing in the machine i (1103) regarding the first server to the 12th server is completed, which is 7 seconds. The time required for DB recovery is shown in FIG. 12.

Figure 15:
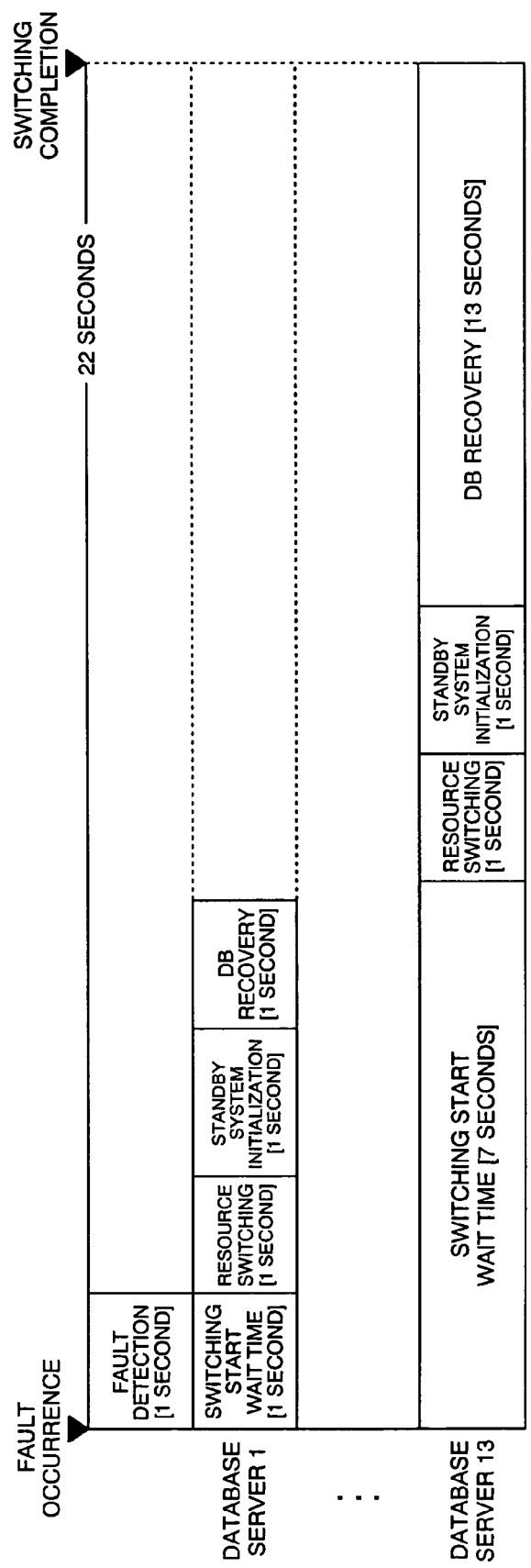
FIG. 15 is a drawing showing one example of details of a system switching time when the present invention is not applied in the embodiment.

FIG. 15 is a drawing showing details of the system switching time of the whole system when system switching was executed in the order of switching order for system construction, in an operation example for the fault occurrence shown in FIG. 11. The switching order of the database server is shown in FIG. 13. As shown in FIG. 15, the database server 1 starts the system switching at first, and the database server 13 starts the system switching finally. Moreover, the database server 1 completes the system switching first, and the database server 13 completes the system switching finally. At this time, the time from fault occurrence until the switching of the database server 1 is completed is 4 seconds. The details include the time of 1 second until the switching starts, the resource switching time of 1 second, the standby system initialization time of 1 second, and the DB recovery time of 1 second. On the other hand, the time from the fault occurrence until the switching of the database server 13 is completed is 22 seconds. The details are the time of 7 seconds until the switching starts, the resource switching time of 1 second, the standby system initialization time of 1 second, and the DB recovery time of 13 seconds. Accordingly, the system switching time of the whole system is the time from the fault occurrence until the switching of the database server 13 is completed, which amounts to 22 seconds.

FIG. 16 is a drawing showing details of the system switching time of the whole system when the system switching time was executed in the switching order decided by a method according to this embodiment, in an operation example for the fault occurrence shown in FIG. 11. The switching order of the database server is shown in FIG. 14. As shown in FIG. 16, the database server 13 starts the system switching at first, and the database server 1 starts the system switching finally. Moreover, the database server 1 completes the system switching at first, and the database server 13 completes the system switching finally. At this time, the time from the fault occurrence until the switching of the database server 1 is completed is 10 seconds. The details are as follows: a time of 7 seconds until switching starts; a resource switching time of 1 second, a standby system initialization time of 1 second: and a DB recovery time of 1 second. On the other hand, the time from the fault occurrence until the switching of the database server 13 is completed is 16seconds. The details are as follows: the time of 1 second until the switching starts; the resource switching time of 1 second; the standby system initialization time of 1 second; and the DB recovery time of 13 seconds. Accordingly, the system switching time of the whole system is the time from the fault occurrence until the switching of the database server 13 is completed amounts to 16 seconds.

In comparison with-of FIG. 15 to FIG. 16, the system switching time of the whole system is proved to be reduced by approximately 27% when a twitching order is decided using a method according to this embodiment. In this case, the system switching time is compared with the switching time when a database server is switched in the order set for system construction.

When the system switching order is controlled using the method according to this embodiment in this manner, the switching order of a database server is maintained in descending order of the number of logs the database server refers to in recovery processing, and the switching time of the whole system can be reduced.

Further, the processing of the database management system executive system processing unit 3300 and the processing of the database management system standby system processing unit 3400 shown in this embodiment are executed as a program in the computer system shown in FIG. 3 as an example. However, the program is not limited to a program stored in an external storage device that is physically connected directly to the computer system as the example of FIG. 3. For example, these programs can be stored in a recording medium that can read and write data from and to a computer such as a hard disk unit or a flexible disk unit. Moreover, these programs can also be stored in the external storage device connected to an information processing unit through a network apart from the information processing unit that constructs the computer of FIG. 3.

In the above example, the switching order of a database server in which a checkpoint occurred is changed so as to be set to be the last among the servers in a machine. As this modification, for example, the switching of a specific server i among multiple database servers 1 to n may also be set so as to be performed first. This server i that always performs data update processing first is more preferentially treated on services than the other servers. The switching order in this case is changed so that the switching order in which a checkpoint occurred as shown in the aforementioned embodiment may be set to be the last among multiple servers except the specific server i.

Moreover, as another example, to the contrary with the above modification, the switching of a specific server j can also be set so as to be always performed last. This server j that always performs the data update processing last is treated the less preferentially than another server. The switching order in this case is changed so that the switching order of the server in which a checkpoint occurred may be set in the second from the last as shown in the embodiment described previously, among the multiple servers except the specific server j. Even in this case, the switching order of the server in which the checkpoint occurred is late. Accordingly, the system switching time is reduced in comparison with the past.

As described above, an example that sets system switching regarding a specific server first or finally can be realized. For example, the processing that registers the information about a database server which fixes a switching order is added to the step 701 of FIG. 7, and the processing that excludes the database server in which the above switching order is fixed first or last from a switching order change object is added to the step 704.

Moreover, in the above embodiment, as soon as a checkpoint occurrence notification is received, the switching order of a database server in which the checkpoint occurred is changed so as to be set to be the last among the servers in a machine. As this modification, a switching order decision unit inquires of each database server about checkpoint occurrence time, and may also set a system switching order so as to be in descending order of the checkpoint occurrence time.

As described above, an example that inquires of each database server about a checkpoint occurrence time and changes a system switching order can be realized. For example, the step 703 of FIG. 7 is changed into the step of inquiring of a database server executive system processing unit about the checkpoint occurrence time and checking the existence of a change in the checkpoint occurrence time, and the processing of changing the switching order is added to the step 704 so that the switching start can be specified in descending order of the checkpoint occurrence time.

Moreover, according the above embodiment, when a fault occurred in a system, the system switching is controlled. According to a modification, however, in addition to fault occurrence in the system, for example, the system can also be switched by allowing the system maintenance engineer to operate the terminal 3006 forcedly. Even in such a case, when the system is switched by delaying the switching order of a server in which a checkpoint occurred, the switching time can be reduced.

Further, the embodiments will be able to variously changed, applied, and executed within the range in which the embodiments will not deviate from the spirit.

What is claimed is:

1. A system switching control method that switches from multiple database servers of an executive system computer to multiple database servers of a standby system computer in a computer system in which the executive system computer and the standby system computer share a database in an external storage device, external of each of said executive and standby system computers, to execute Input/Output (I/O) processing request, said system switching control method comprising:

registering order information in a storage device of said executive system computer that indicates an order in which the multiple database servers of said executive system computer are switched to the database servers of the standby system computer;

detecting that a checkpoint occurred in one of the database servers of the executive system computer so that update to data in a cache memory of the data server in which the checkpoint occurred is reflected to the database in the external storage device to update the database in the latest state;

changing the order information upon detection of the checkpoint so that a switching sequence of the database server of the executive system computer in which the checkpoint occurred follows a switching sequence of the other database servers; and executing system switching processing from the executive system computer to the standby system computer in accordance with the changed order information, wherein the order information is changed in accordance with the checkpoint occurrence time so that a switching order of the database server in which the checkpoint occurred is set to the last.

2. The system switching control method according to claim 1, further comprising:

storing a log file that stores a log which occurred based on the database server of the executive system computer in the external storage device that are shared by the executive system computer and the standby system computer, wherein when the check point occurred, the order information is changed so that the order of switching of the database server may be set in accordance with a number of logs of the log file so that the database server having the greatest number of logs is started at the first to switch to a database server of the standby system computer.

3. The system switching control method according to claim 1, further comprising:

detecting that a fault has occurred in the executive system computer, wherein when the fault occurrence is detected, a step of executing switching processing is executed.

4. The system switching control method according to claim 1, wherein said executing the switching processing, comprises:

separating a resource related to the database server of the executive system computer specified in accordance with the order information, and specifying the database server of the standby system computer that functions as a standby system switching target.

5. The system switching control method according to claim 4, wherein said executing the switching processing comprises:

validating a resource corresponding to the database server to be accepted in a standby system computer, and executing recovery processing of the database with reference to the log file.

6. A program stored on a storage medium that switches from multiple database servers of an executive system computer to multiple database servers of a standby system computer in a computer system in which the executive system computer and the standby system computer share a database in an external storage device, external of each of said executive and standby system computers, to execute Input/Output (I/O) processing request, said program when executed causes a computer to perform the steps of:

registering order information in a storage device of said executive system computer that indicates an order in which the multiple database servers of the executive system computer are switched to the database servers of the standby system computer;

detecting that a checkpoint occurred in one of the database servers of the executive system computer so that update to data in a cache memory of the data server in which the checkpoint occurred is reflected to the database in the external storage device to update the database in the latest state;

changing the order information upon detection of the checkpoint so that a switching sequence of the database server of the executive system computer in which the checkpoint occurred follows a switching sequence of the other database servers; and executing system switching processing from the executive system computer to the standby system computer in accordance with the changed order information, wherein the order information is changed in accordance with the checkpoint occurrence time so that a switching order of the database server in which the checkpoint occurred is set to the last.

* * * * *